US010795725B2

United States Patent
Nagao et al.

(10) Patent No.: US 10,795,725 B2
(45) Date of Patent: Oct. 6, 2020

(54) IMAGE PROCESSING DEVICE, IMAGE PROCESSING METHOD, AND NON-TRANSITORY COMPUTER READABLE MEDIUM FOR IMAGE PROCESSING

(71) Applicants: FUJI XEROX CO., LTD., Tokyo (JP); FUJIFILM Corporation, Tokyo (JP)

(72) Inventors: Takashi Nagao, Kanagawa (JP); Kazuyuki Itagaki, Kanagawa (JP); Kosei Takemoto, Kanagawa (JP)

(73) Assignees: FUJI XEROX CO., LTD., Minato-ku Tokyo (JP); FUJIFILM Corporation, Minato-ku, Tokyo (JP)

( * ) Notice: Subject to any disclaimer, the term of this patent is extended or adjusted under 35 U.S.C. 154(b) by 183 days.

(21) Appl. No.: 16/061,075

(22) PCT Filed: Jul. 27, 2016

(86) PCT No.: PCT/JP2016/072032
§ 371 (c)(1),
(2) Date: Jun. 11, 2018

(87) PCT Pub. No.: WO2017/163442
PCT Pub. Date: Sep. 28, 2017

(65) Prior Publication Data
US 2018/0365059 A1 Dec. 20, 2018

(30) Foreign Application Priority Data

Mar. 24, 2016 (JP) .................................. 2016-060526

(51) Int. Cl.
G06F 9/46 (2006.01)
G06F 9/48 (2006.01)
G06F 9/50 (2006.01)

(52) U.S. Cl.
CPC .............. *G06F 9/4881* (2013.01); *G06F 9/50* (2013.01)

(58) Field of Classification Search
CPC ................................ G06F 9/4881; G06F 9/50
See application file for complete search history.

(56) References Cited

U.S. PATENT DOCUMENTS

2014/0259563 A1* 9/2014 LaVon .................. A61F 13/622
24/442
2014/0359563 A1* 12/2014 Xie .......................... G06F 8/34
717/106

(Continued)

FOREIGN PATENT DOCUMENTS

| JP | 2009-199303 A | 9/2009 |
| JP | 2010-146055 A | 7/2010 |
| JP | 4965995 B2 | 7/2012 |

OTHER PUBLICATIONS

Rocklin, Dask: Parallel Computation with Blocked algorithms and Task Scheduling, SCIPY 2015, pp. 126-132.*

(Continued)

*Primary Examiner* — Diem K Cao
(74) *Attorney, Agent, or Firm* — Sughrue Mion, PLLC (57) ABSTRACT

An image processing device executes image processing by each object of an object group in which plural objects are connected to each other in a directed acyclic graph form. A processing unit performs updating processing and imparting processing, the updating processing for updating image processing which is executed by each object of the object group to partial processing which performs image processing on division image data representing a division image obtained by dividing an input image represented by input image data into plural partial regions, and the imparting processing for imparting a dependency relationship between pieces of the partial processing of the objects connected to each other. A controller performs control for causing plural computation devices to execute, in parallel, the updating processing and the imparting processing by the processing unit and the partial processing which becomes executable based on the dependency relationship.

21 Claims, 9 Drawing Sheets

(56) References Cited

U.S. PATENT DOCUMENTS

2015/0046678 A1 2/2015 Moloney et al.
2016/0267622 A1* 9/2016 Brothers .................. G06T 1/20

OTHER PUBLICATIONS

Lutz et al., Helium: A Transparent Inter-kernel Optimizer for OpenCL, ACM, 2015, 11 pages.*
Igor Belyakov et al., "Deferred Mode Image Processing Framework: Simple and efficient use of Intel® multi-core technology and many-core architectures with Intel® Integrated Performance Primitives", Intel Developer Zone, Feb. 13, 2010. (26 pages total).
Khronos Group, "The OpenVX Specification", Khronos Vision Working Group, Version 1.0.1, 2014, Document Revision: r31169, Genereated on Wednesday, May 13, 2015, [online], [search on Mar. 11, 2016], Internet <URL: https://www.khronos.org/registry/vx/specs/1.0.1/OpenVX_Specification_1_0_1.pdf>. (263 pages total).
Search Report dated Sep. 6, 2016 by the International Searching Authority in counterpart International Patent Application No. PCT/JP2016/072032. (PCT/ISA/210).
Written Opinion dated Sep. 6, 2016 by the International Searching Authority in counterpart International Patent Application No. PCT/JP2016/072032. (PCT/ISA/237).
Office Action dated Nov. 5, 2019 by the Japanese Patent Office in counterpart Japanese Patent Application No. 2018-506750.

* cited by examiner

IMAGE PROCESSING DEVICE, IMAGE PROCESSING METHOD, AND NON-TRANSITORY COMPUTER READABLE MEDIUM FOR IMAGE PROCESSING

CROSS-REFERENCE TO RELATED APPLICATIONS

This application is based on and claims priority under 35 U.S.C. § 119 from Japanese Patent Application No. 2016-60526 filed on Mar. 24, 2016

BACKGROUND

Technical Field

The present invention relates to an image processing device, an image processing method, and a non-transitory computer readable medium for image processing.

SUMMARY

According to an aspect of the present invention, there is provided an image processing device that executes image processing by each object of an object group in which plural objects are connected to each other in a directed acyclic graph form. The image processing device includes: a processing unit that performs updating processing and imparting processing, the updating processing for updating image processing which is executed by each object of the object group to partial processing which performs image processing on division image data representing a division image obtained by dividing an input image represented by input image data into plural partial regions, and the imparting processing for imparting a dependency relationship between pieces of the partial processing of the objects connected to each other; and a controller that performs control for causing plural computation devices to execute, in parallel, the updating processing and the imparting processing by the processing unit and the partial processing which becomes executable based on the dependency relationship.

According to an aspect of the present invention, it is possible to improve a processing speed of image processing, as compared with a case where each partial processing is executed after processing of updating each object of an object group in which objects for executing image processing are connected to each other in a DAG form to plural pieces of partial processing is performed for all objects.

BRIEF DESCRIPTION OF THE DRAWINGS

Exemplary embodiment of the present invention will be described in detail based on the following figures, wherein.

DETAILED DESCRIPTION

Hereinafter, exemplary embodiments according to the present invention will be described in detail with reference to the drawings.

First, a configuration of a computer 10 that functions as an image processing device will be described referring to FIG. 1. The computer 10 may be a copier, a printer, a facsimile machine, a multifunctional machine having the functions of these devices, or a computer incorporated in an image handling device such as a scanner that performs image processing. In addition, the computer may be an independent computer such as a personal computer (PC), and may be a computer incorporated in a portable device such as a personal digital assistant (PDA) or a mobile phone.

Figure 1:
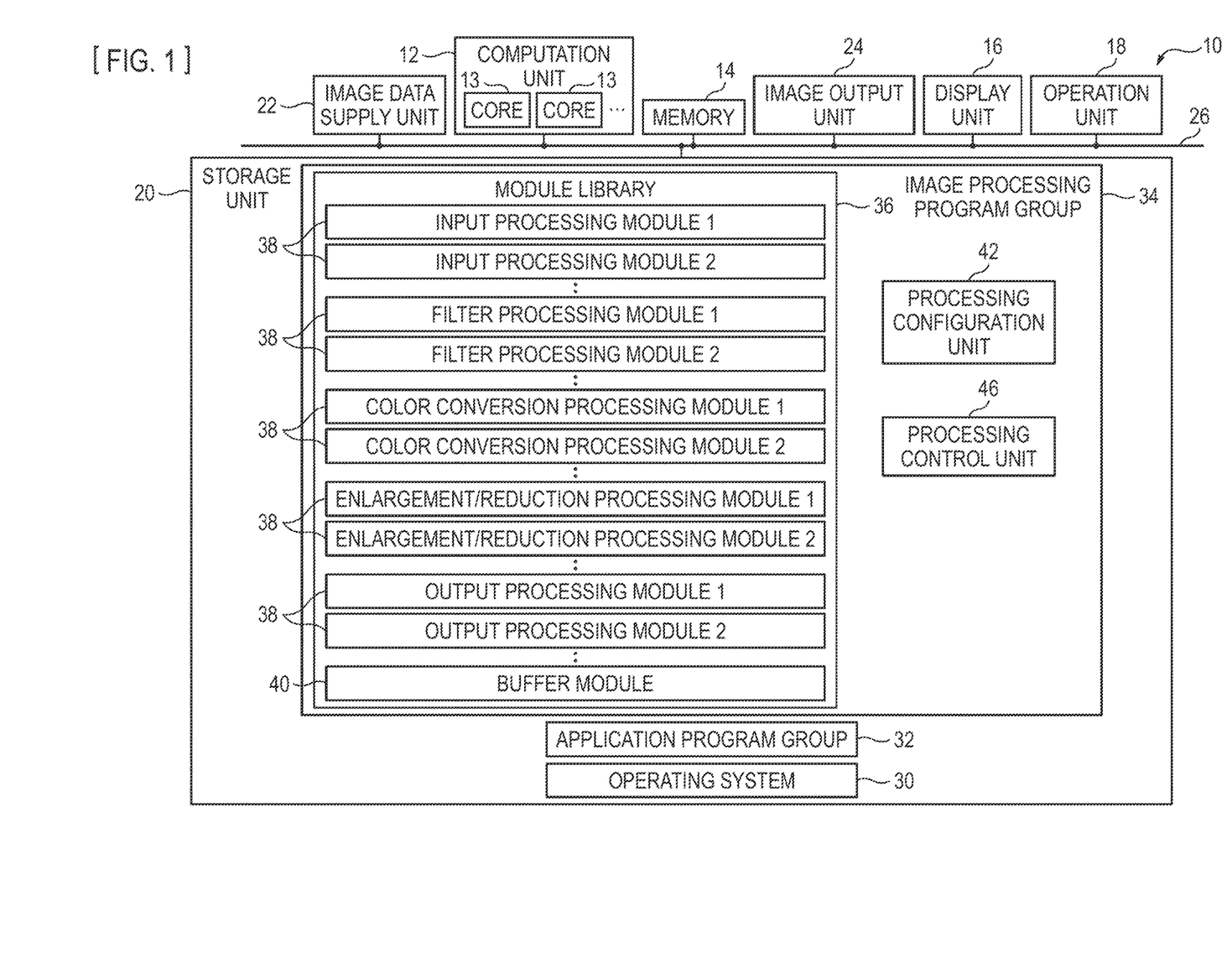
FIG. 1 is a block diagram illustrating an example of a configuration of a computer that functions as an image processing device according to an embodiment.

As illustrated in FIG. 1, the computer 10 according to the present exemplary embodiment includes a computation unit 12, a memory 14, a display unit 16, an operation unit 18, a storage unit 20, an image data supply unit 22, and an image output unit 24. In addition, each unit of the computation unit 12, the memory 14, the display unit 16, the operation unit 18, the storage unit 20, the image data supply unit 22, and the image output unit 24 are connected to each other via a bus 26.

The computation unit 12 according to the present exemplary embodiment is a main processor of the computer 10, and is a central processing unit (CPU) including plural processor cores 13 (hereinafter, referred to as "cores 13") as an example. Each of the cores 13 is an example of a computation device that executes image processing. In the following description, in a case of distinguishing each of the cores 13, as in the core 13A and the core 13B, an alphabet is added to the end of the reference numeral 13.

As described above, in the present exemplary embodiment, although a case where one computation unit 12 is provided is described, the present invention is not limited thereto. Plural computation units 12 may be provided. In a case where plural computation units 12 are provided, the plural computation units 12 may be the same type of CPUs, or different types of CPUs. In addition, in a case where the plural the computation units 12 are provided, the plural computation units 12 may include a graphics processing unit (GPU) or a computation device such as a field programmable gate array (FPGA).

The memory 14 is nonvolatile storage means for temporarily storing data by the computation unit 12.

In a case where the computer 10 is incorporated in the image handling device, as the display unit 16 and the operation unit 18, for example, a display panel such as a liquid crystal display (LCD), a ten key, and the like, which are provided on the image handling device, may be used. In a case where the computer 10 is an independent computer, as the display unit 16 and the operation unit 18, for example, a display, a keyboard, a mouse, and the like, which are connected to the computer 10, may be used. In addition, the display unit 16 and the operation unit 18 may be a touch panel display or the like formed by integrating a touch panel and a display. In addition, as the storage unit 20, a nonvolatile storage medium such as a hard disk drive (HDD), a solid state drive (SSD), or a flash memory may be used.

The image data supply unit 22 may be any device as long as the image data supply unit supplies image data as a processing target. For example, an image reading unit that reads an image recorded on a recording material such as paper or a photographic film and outputs image data may be used. In addition, as the image data supply unit 22, for example, a receiving unit that receives image data from an external device via a communication line and an image storage unit (the memory 14 or the storage unit 20) that stores image data may be used.

The image output unit 24 may be any device as long as the image output unit outputs image data subjected to image processing or an image represented by image data subjected to image processing. For example, as the image output unit, an image recording unit that records an image represented by image data on a recording material such as paper or a photosensitive material may be used. In addition, as the image output unit 24, a display unit (the display unit 16) that displays an image represented by image data on a display or the like or a writing device that writes image data on a recording medium such as a compact disk read only memory (CD-ROM) may be used. In addition, as the image output unit 24, a transmission unit that transmits image data subjected to image processing to an external device via a communication line may be used. In addition, the image output unit 24 may be an image storage unit (the memory 14 or the storage unit 20) that stores image data subjected to image processing.

As illustrated in FIG. 1, the storage unit 20 stores various programs to be executed by the computation unit 12. The storage unit 20 stores programs of an operating system 30, as various programs, the programs including a program for resource management, a program for program execution management, a program for communication between the computer 10 and an external device, and the like. In addition, the storage unit 20 stores an image processing program group 34 for causing the computer 10 to function as an image processing device, as various programs. In addition, the storage unit 20 stores a various-application-program group 32 (hereinafter, referred to as an "application 32") for causing the image processing device to perform desired image processing, as various programs.

The image processing program group 34 includes a program developed for a purpose of reducing a load when developing an image processing program to be executed by the image handling device, the portable device, the PC, and the like. In addition, the image processing program group 34 includes a program developed so as to be commonly executed on various kinds of devices (platforms) such as the image handling device, the portable device, the PC, and the like.

The image processing device realized by the image processing program group 34 configures an image processing DAG 50A (to be described in detail) that performs image processing instructed by the application 32, according to a configuration instruction from the application 32. The image processing device executes processing of the image processing DAG 50A according to an execution instruction from the application 32. In this manner, the image processing program group 34 provides an interface for the application 32, the interface instructing a configuration of the image processing DAG 50A that performs desired image processing or instructing an execution of image processing by the configured image processing DAG 50A.

With the configuration, even in a case of newly developing a certain device that needs to perform image processing internally, for development of a program that performs the image processing, an application 32, which causes the image processing program group 34 to perform the image processing required in the certain device, may be developed by using the interface. Therefore, a developer does not need to newly develop a program that actually performs image processing, and thus a load of the developer is reduced.

Next, the image processing program group 34 according to the present exemplary embodiment will be described in detail. As illustrated in FIG. 1, the image processing program group 34 includes a module library 36, a program functioning as a processing configuration unit 42, and a program functioning as a processing control unit 46.

In the module library 36, programs of plural types of image processing modules 38 that perform predetermined image processing different from each other are registered. Examples of the image processing include, for example, input processing, filter processing, color conversion processing, enlargement processing and reduction processing (denoted as "enlargement/reduction processing" in FIG. 1), skew angle detection processing, image rotation processing, image synthesis processing, output processing, and the like.

In addition, in the module library 36, image processing modules 38 having the same image processing type and different image processing contents to be executed are also registered. In FIG. 1, the image processing modules are distinguished from each other by adding numbers at the ends, as in "module 1", "module 2", and the like. For example, as the image processing module 38 that performs the enlargement/reduction processing, an image processing module 38 that performs processing of reducing horizontal and vertical sizes of an image to 50% by thinning-out input image data for each one pixel in each direction of a horizontal direction and a vertical direction, is prepared. Further, for example, as the image processing module 38 that performs enlargement/reduction processing, an image processing module 38 that performs enlargement/reduction processing of input image data at a specified enlargement/reduction ratio, is prepared.

In addition, for example, as the image processing module 38 that performs color conversion processing, an image processing module 38 that converts an image in a red, green, and blue (RGB) color space into an image in a cyan, magenta, yellow, and key-plate (black) (CMYK) color space, and an image processing module 38 that converts an image in a CMYK color space into an image in an RGB color space are prepared. Further, for example, as the image processing module 38 that performs color conversion processing, an image processing module 38 that converts an image in an RGB color space into an image in an YCbCr color space and an image processing module 38 that converts an image in an YCbCr color space into an image in an RGB color space are prepared.

In addition, in the module library 36, a buffer module 40 including a storage area (buffer) for storing image data is also registered.

Figure 2A:
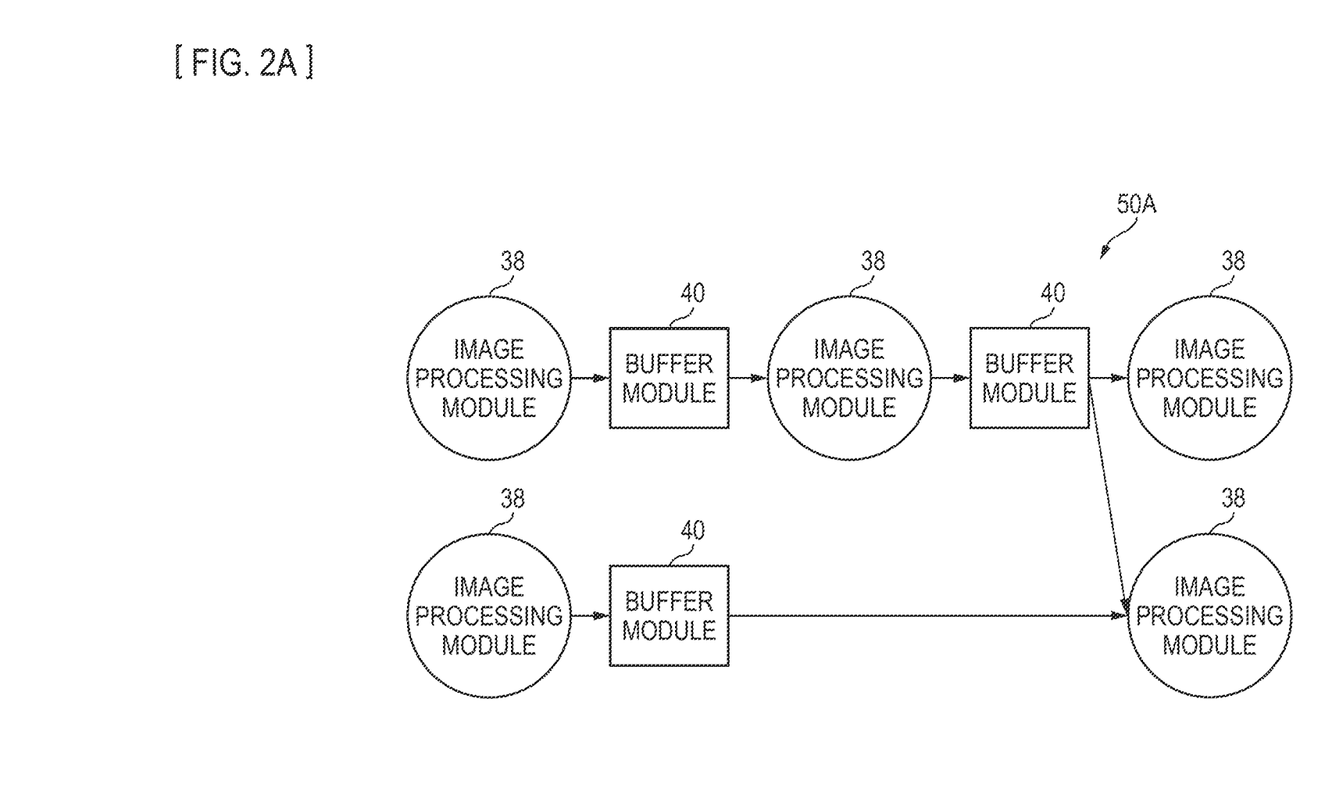
FIG. 2A is a schematic diagram illustrating an example of an image processing DAG.

According to an instruction from the application 32, the processing configuration unit 42 according to the present exemplary embodiment configures the image processing DAG 50A in a DAG form. As illustrated in FIG. 2A, in the image processing DAG 50A, as an example, one or more image processing modules 38 are connected to each other via the buffer module 40 disposed in at least one of a pre-stage and a post-stage of each of the image processing modules 38.

Each of the image processing modules 38 is an example of an object that executes image processing on input image data. In addition, the image processing DAG 50A is an example of an object group in which plural image processing modules 38 are connected to each other. In addition, in an example illustrated in FIG. 2A, for the image processing module 38 connected to the pre-stage image processing module 38 via the buffer module 40, in a case where image processing by the pre-stage image processing module 38 is completed, image processing by the image processing module 38 can be executed. In addition, in the example illustrated in FIG. 2A, for the image processing module 38 connected to the plural pre-stage image processing modules 38 via the buffer modules 40, in a case where all image processing by the plural pre-stage image processing modules 38 is completed, image processing by the image processing module 38 can be executed.

Figure 2B:
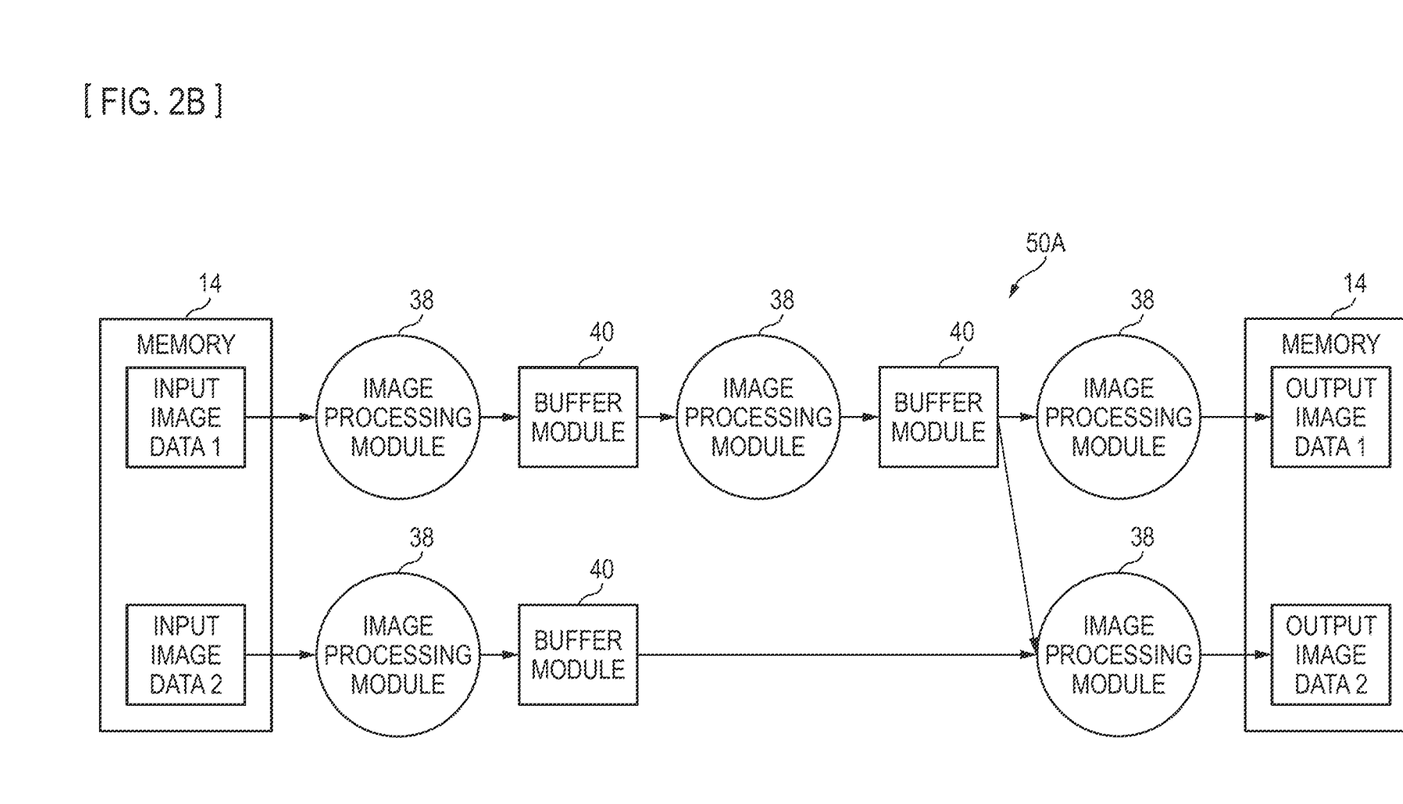
FIG. 2B is a schematic diagram illustrating an example of a case where an input/output memory is added to the image processing DAG.

In addition, FIG. 2A illustrates a DAG in which only the modules are connected to each other in order of processing. On the other hand, when the DAG is executed, as illustrated in FIG. 2B, image data stored in the memory is input, and the image processing is performed according to the DAG. A processing result such as image data subjected to the processing is finally stored in the memory 14.

Figure 3:
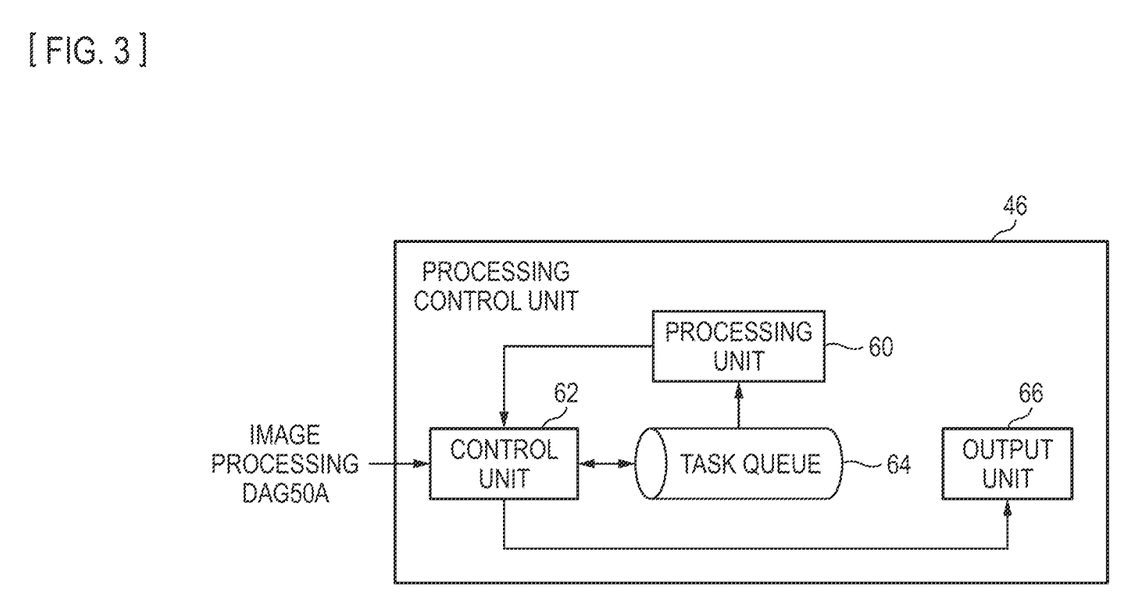
FIG. 3 is a block diagram illustrating an example of a functional configuration of a processing control unit according to the embodiment.

Next, a functional configuration of the processing control unit 46 according to the present exemplary embodiment will be described with reference to FIG. 3. As illustrated in FIG. 3, the processing control unit 46 includes a processing unit 60, a control unit 62, a task queue 64, and an output unit 66.

Figure 4:
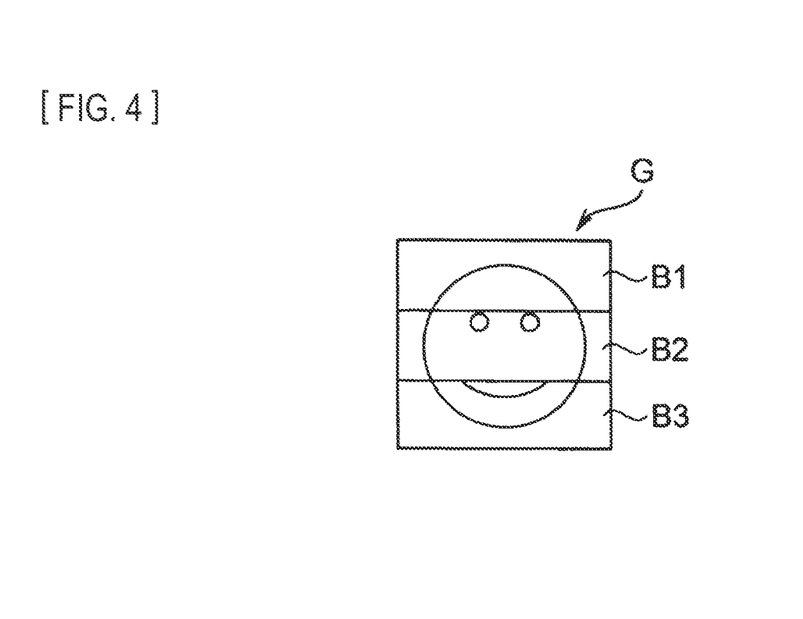
FIG. 4 is a schematic diagram for explaining an example of division processing of an input image.

The processing unit 60 according to the present exemplary embodiment divides an image represented by a portion as a processing target of the input image data into plural partial regions (hereinafter, referred to as "division images"). As illustrated in FIG. 4, as an example, the processing unit 60 divides an image G represented by a portion as a processing target of the input image data into plural (in the example illustrated in FIG. 4, three) division images B1 to B3. In the following description, image data representing the division image is referred to as "division image data". In addition, in image processing such as color conversion processing in which the entire input image is a processing target, a portion which is a processing target of the input image data means a portion in which the entire input image data is a processing target. In addition, in image processing such as clipping (trimming) processing in which a portion of the input image is a processing target, a portion which is a processing target of the input image data means a portion of the input image. In the following description, in order to avoid confusion, the portion which is a processing target of the input image data is simply referred to as "input image data".

In addition, in an example illustrated in FIG. 4, although the processing unit 60 divides the image G vertically when viewed from the front, the invention is not limited thereto. For example, the processing unit 60 may divide the image G horizontally when viewed from the front, or divide the image G vertically and horizontally when viewed from the front.

The number of divisions of the input image data by the processing unit 60 is not particularly limited. For example, the processing unit 60 may divide the input image data by a predetermined number or size. In addition, for example, the processing unit 60 may divide the input image data into a number equal to or smaller than the number of processor cores of the computation unit that executes image processing by the image processing module 38, and equal to or larger than two.

In addition, for example, the processing unit 60 may divide the input image data by a size equal to or smaller than a capacity of a cache memory of the computation unit that executes image processing by the image processing module 38. In this case, for example, a form in which the processing unit 60 divides the input image data by a size is exemplified, the size being equal to or smaller than a capacity of a cache memory, which is at the farthest level from the processor of the computation unit that executes image processing by the image processing module 38, a so-called last level cache (LLC), and being maximally matched to the capacity of the LLC.

Figure 5:
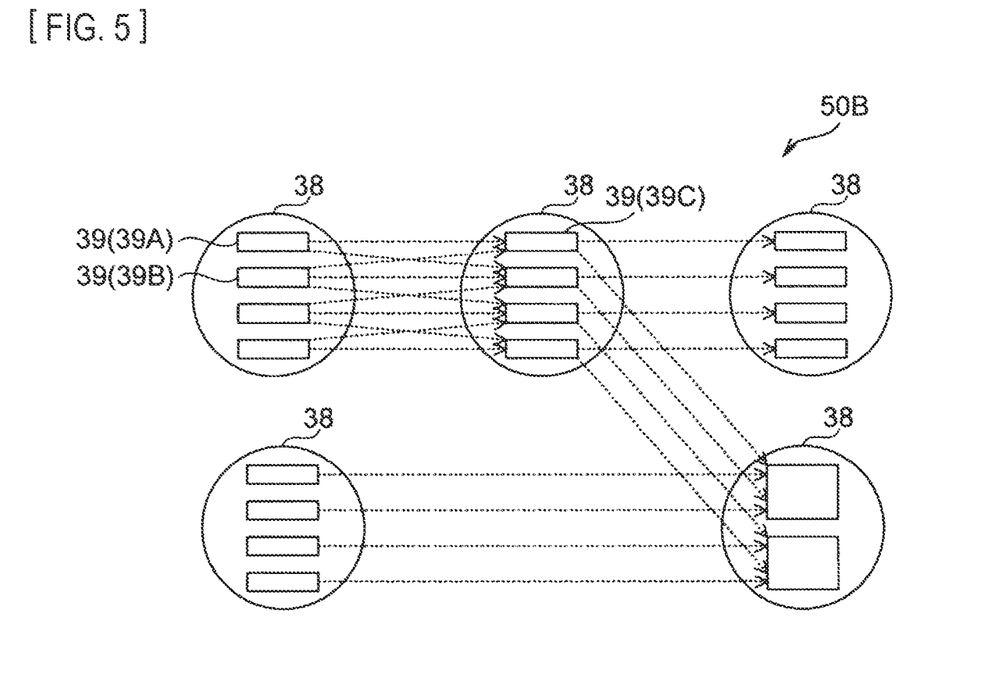
FIG. 5 is a schematic diagram illustrating an example of an image processing DAG in which an image processing module is divided into partial processing.

As illustrated in FIG. 5, as an example, the processing unit 60 divides the image processing which is executed by each image processing module 38 of the image processing DAG 50A into partial processing 39 corresponding to each of the division image data, and updates the image processing DAG 50A to an image processing DAG 50B. FIG. 5 illustrates the image processing DAG 50B in a case where the input image data of the image processing DAG 50A illustrated in FIG. 2A is divided into four pieces of division image data. In FIG. 5, in order to avoid confusion, the buffer module 40 is not illustrated.

According to the type of the image processing executed by the image processing module 38, the processing unit 60 according to the present exemplary embodiment imparts a dependency relationship between the partial processing 39 of the image processing module 38 connected to the pre-stage and the partial processing 39 of the image processing module 38 connected to the post-stage. In FIG. 5, the dependency relationship is indicated by a broken-line arrow.

For example, as in color conversion processing, in processing of performing image processing on only pixels as processing targets, the control unit imparts a one-to-one dependency relationship to each partial processing 39. On the other hand, for example, as in filter processing, in image processing in which pixels adjacent to the pixels as processing targets are also required, the control unit also imparts a dependency relationship to the pre-stage partial processing 39 which performs image processing on the adjacent pixels. That is, the dependency relationship is a relationship between the image processing modules 38 connected to each other, in which the partial processing of the image processing module 38 connected to the post-stage can be executed in a case where the partial processing 39 of the image processing module 38 connected to the pre-stage is completed. Therefore, each partial processing 39 can be executed in a case where there is no pre-stage partial processing 39 to which a dependency relationship is imparted, or in a case where all of pre-stage partial processing 39 to which a dependency relationship is imparted are completed.

Specifically, for example, the partial processing 39A and the partial processing 39B illustrated in FIG. 5 can be executed when starting an execution of image processing. In addition, for example, the partial processing 39C illustrated in FIG. 5 can be executed when both of the pre-stage partial processing 39A and the pre-stage partial processing 39B to which a dependency relationship is imparted are completed.

The control unit 62 according to the present exemplary embodiment performs control for causing the plural cores 13 to execute, in parallel, updating processing of the image processing DAG 50A and imparting processing of the dependency relationship by the processing unit 60, and partial processing 39 that becomes executable based on the dependency relationship. Here, parallel processing means that at least a part of processing of the updating processing and the imparting processing, and the partial processing 39 that becomes executable based on the dependency relationship is executed in parallel (simultaneously) by the plural cores 13. Specifically, the control unit 62 stores tasks (processing) for executing the updating processing of the image processing DAG 50A and the imparting processing of the dependency relationship for each image processing module 38, in the task queue 64 such that each of the plural cores 13 sequentially reads and executes the stored tasks. Further, during the updating processing and the imparting processing by the processing unit 60, the control unit 62 sequentially stores the partial processing that becomes executable based on the dependency relationship, in the task queue 64.

Under the control of the control unit 62, the output unit 66 according to the present exemplary embodiment outputs output image data obtained by executing the image processing by the final-stage image processing module 38 of the image processing DAG 50B. In the present exemplary embodiment, the output unit 66 displays an output image represented by the obtained output image data, on the display unit 16. The output unit 66 may output (transmit) the output image data to an external device. In addition, in a case where the computer 10 is incorporated in a printer, the output unit 66 may output (form) an output image represented by the output image data on a recording material such as paper.

Figure 6:
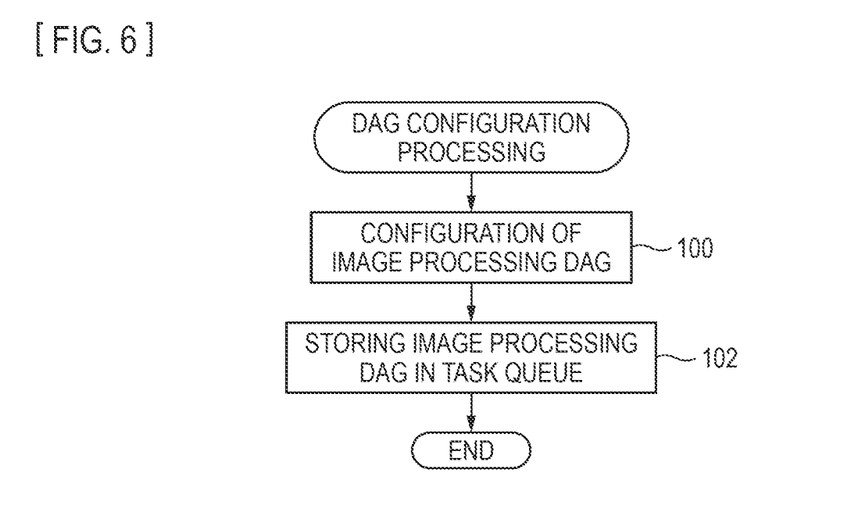
FIG. 6 is a flowchart illustrating a flow of processing of a DAG configuration processing program according to an embodiment.

Next, an operation of the computer 10 according to the present exemplary embodiment will be described with reference to FIGS. 6 to 11. FIG. 6 is a flowchart illustrating a flow of processing of a DAG configuration processing program that is executed by the computation unit 12 in a case where an instruction to start an execution of image processing is input by the application 32. In addition, the DAG configuration processing program is installed in the storage unit 20 in advance. In addition, any task is not executed in the computation unit 12, and the core 13 capable of executing a task executes the DAG configuration processing program. Thus, the program functions as the processing configuration unit 42 and the control unit 62.

In step 100 of FIG. 6, the processing configuration unit 42 configures an image processing DAG 50A that performs image processing instructed by the application 32, according to a configuration instruction from the application 32. In next step 102, the control unit 62 stores tasks for executing updating processing of the image processing DAG 50A configured in step 100 and imparting processing of the dependency relationship for each image processing module 38, in the task queue 64, and then ends the DAG configuration processing.

Figure 7:
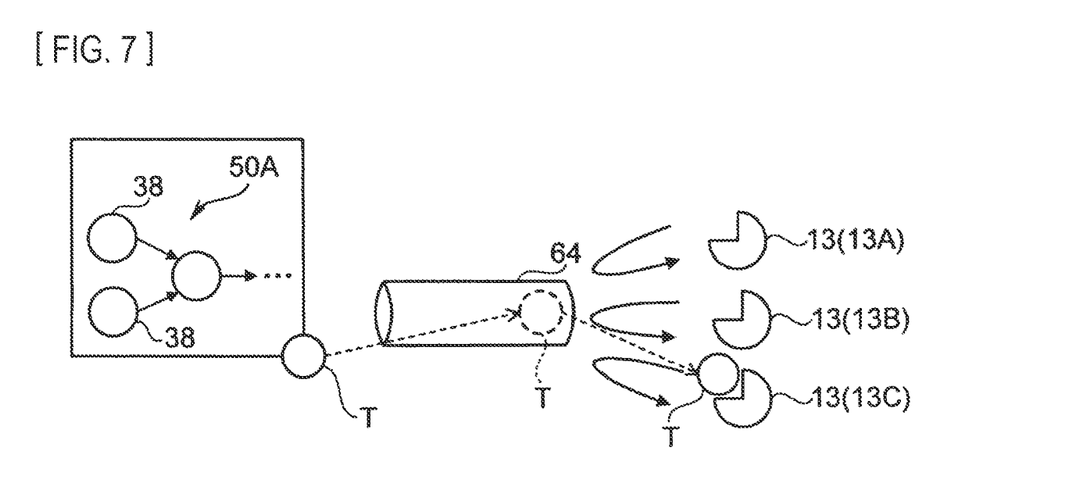
FIG. 7 is a schematic diagram for explaining DAG updating processing according to an embodiment.

As illustrated in FIG. 7, as an example, by the processing of step 102, the tasks T for executing the updating processing of the image processing DAG 50A and the imparting processing of the dependency relationship for each image processing module 38 are stored in the task queue 64. The core 13 (in the example illustrated in FIG. 7, the core 13C) capable of executing a task reads the task T from the task queue 64, and executes the task T. Thus, the DAG updating processing illustrated in FIG. 8 is executed.

Figure 8:
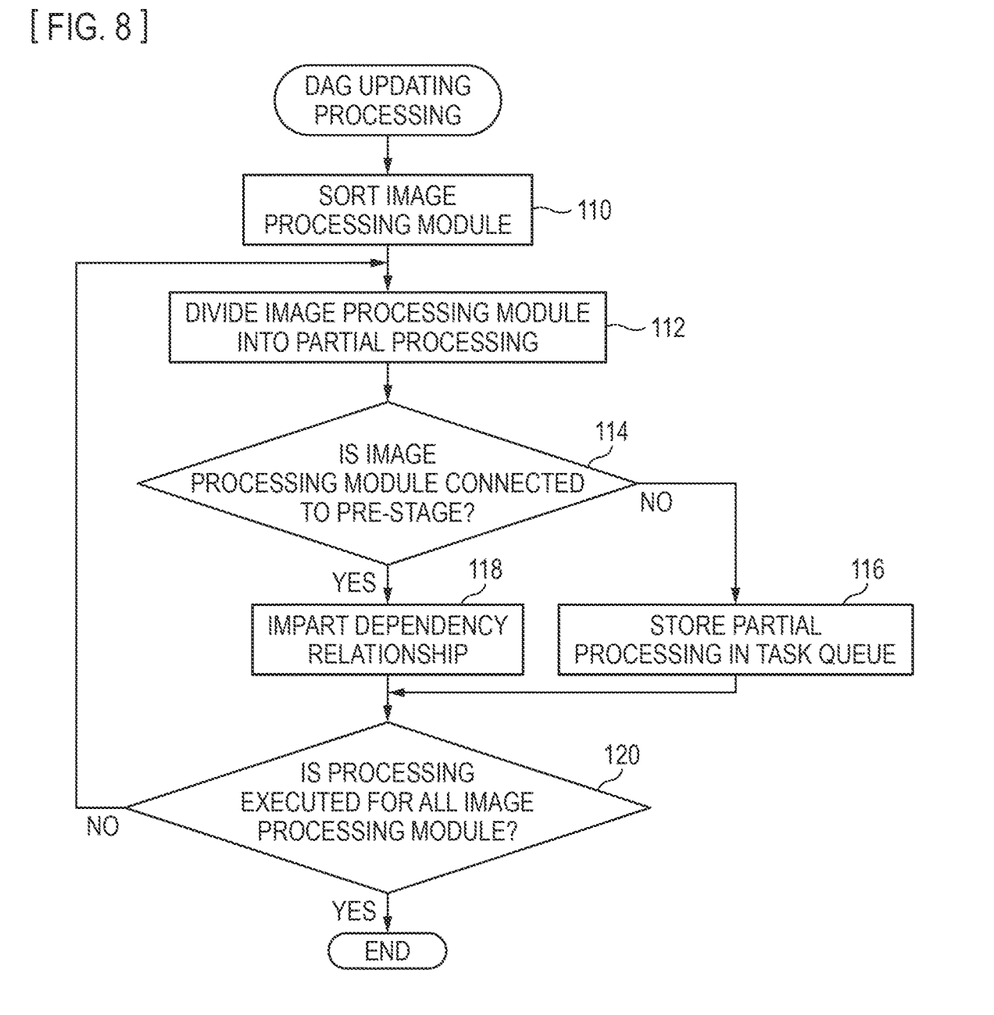
FIG. 8 is a flowchart illustrating a flow of processing of a DAG updating processing program according to an embodiment.

FIG. 8 is a flowchart illustrating a flow of processing of a DAG updating processing program, and the DAG updating processing program is also installed in the storage unit 20 in advance. In addition, the core 13 capable of executing a task executes the DAG updating processing program, and thus, the program functions as the processing unit 60 and the control unit 62.

In step 110 of FIG. 8, the processing unit 60 sorts all of the image processing modules 38 included in the image processing DAG 50A, by a known sorting method such as topological sorting. In repetition processing of the following steps 112 to 118, it is assumed that the image processing modules 38 are sequentially executed one by one in order from the top of all of the image processing modules 38 sorted in step 110 as processing targets (hereinafter, referred to as "processing target modules 38").

In step 112, as described above, the processing unit divides the input image data into plural pieces of division image data. As described above, the processing unit 60 updates the image processing which is executed by the processing target module 38 to the partial processing 39 corresponding to each of the pieces of division image data. In next step 114, the processing unit 60 determines whether or not an image processing module 38 is connected to a pre-stage of the processing target module 38. In a case where the determination result is Yes, the processing unit 60 proceeds to step 118, and in a case where the determination result is No, the processing unit 60 proceeds to step 116.

In step 116, the control unit 62 sequentially stores the partial processing 39 of the processing target module 38 that is divided in step 112, in the task queue 64. On the other hand, in step 118, as described above, according to the type of the image processing which is executed by the processing target module 38, the processing unit 60 imparts a dependency relationship between the partial processing 39 of the image processing module 38 connected to the pre-stage and the image processing module 38 connected to the post-stage.

In step 120, the processing unit 60 determines whether or not the processing of steps 112 to 118 is executed for all of the image processing modules 38 of the image processing DAG 50A. In a case where the determination result is No, the processing unit 60 returns to step 112, and in a case where the determination result is Yes, the processing unit 60 ends the DAG updating processing.

Figure 9:
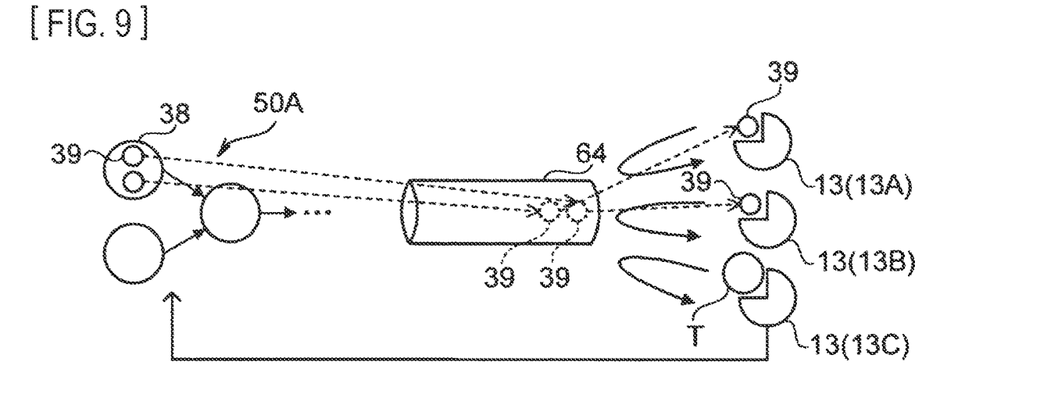
FIG. 9 is a schematic diagram for explaining an execution of partial processing in a foremost-stage image processing module.

As illustrated in FIG. 9, as an example, by the processing of step 116, the partial processing 39 of the foremost-stage image processing module 38 is sequentially stored in the task queue 64. The cores 13 (in the example illustrated in FIG. 9, the cores 13A and 13B) capable of executing tasks read the partial processing 39 from the task queue 64, and execute the partial processing 39. On the other hand, for the image processing modules 38 other than the foremost-stage image processing module, the processing of step 112 and step 116 is subsequently executed. That is, as illustrated in FIG. 9, the task T and the partial processing 39 are executed in parallel by the plural cores 13.

Figure 10:
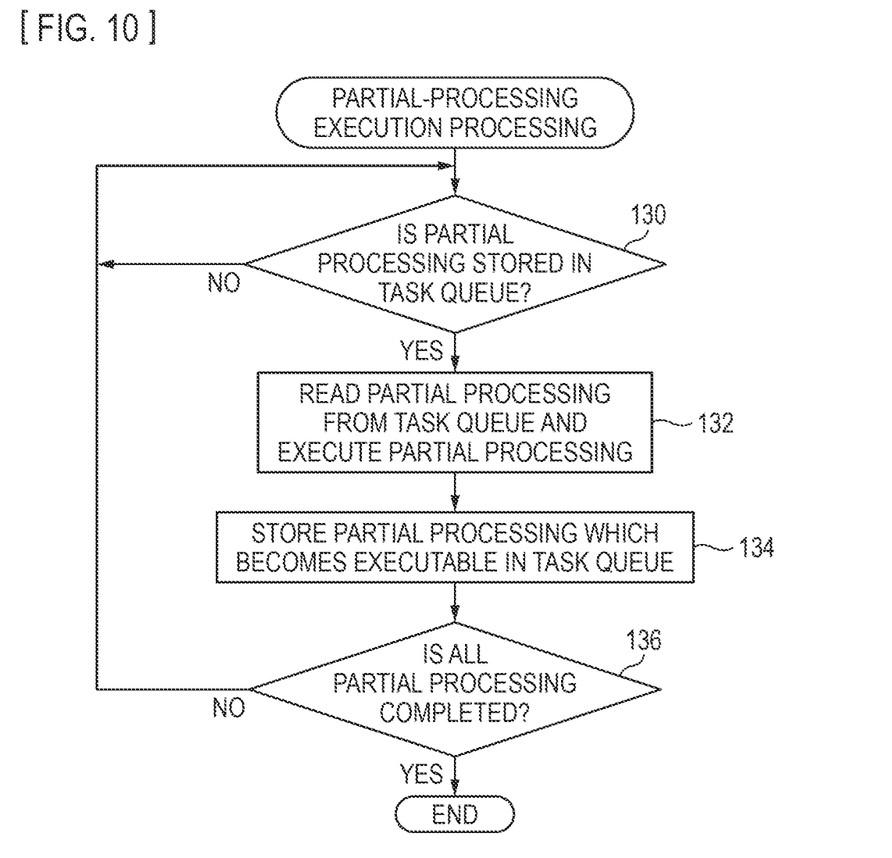
FIG. 10 is a flowchart illustrating a flow of processing of a partial-processing execution processing program according to an embodiment.

On the other hand, FIG. 10 is a flowchart illustrating a flow of processing of a partial-processing execution processing program that is executed by the computation unit 12 in a case where an instruction to start an execution of image processing is input by the application 32. In addition, the partial-processing execution processing program is also installed in the storage unit 20 in advance. In addition, the core 13 capable of executing a task executes the partial-processing execution processing program, and thus the program functions as the control unit 62.

In step 130 of FIG. 10, the control unit 62 determines whether or not the partial processing 39 is stored in the task queue 64. In a case where the determination result is No, the control unit 62 repeatedly executes the processing of step 130, and in a case where the determination result is Yes, the control unit 62 proceeds to step 132.

In step 132, the control unit 62 reads one piece of partial processing 39 from the top of the task queue 64, and executes the partial processing 39 which is read. In next step 134, when the execution of the partial processing 39 by the processing of step 132 is completed, the control unit 62 updates the dependency relationship, and sequentially stores partial processing 39 which becomes newly executable based on the dependency relationship, in the task queue 64.

In next step 136, the control unit 62 determines whether or not all the partial processing 39 of all the image processing modules 38 of the image processing DAG 50B is completed. In a case where the determination result is No, the control unit 62 returns to step 130, and in a case where the determination result is Yes, the control unit 62 ends the partial-processing execution processing. In addition, when all the partial processing of all the image processing modules 38 is completed, the output unit 66 outputs an output image represented by output image data which is output by the partial processing 39 of the final-stage image processing module 38 of the image processing DAG 50B, to the display unit 16.

Figure 11:
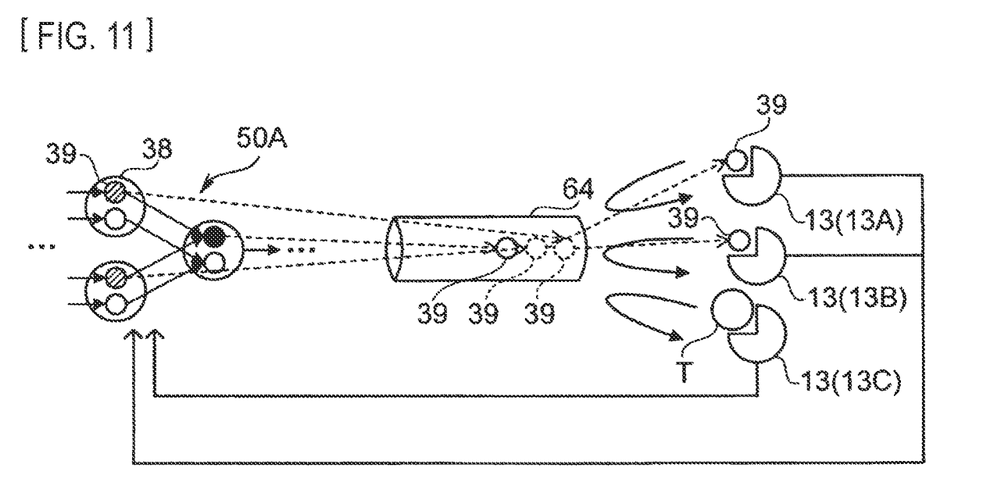
FIG. 11 is a schematic diagram for explaining an execution of partial processing which becomes newly executable.

As illustrated in FIG. 11, as an example, the partial processing 39 stored in the task queue 64 is executed by the cores 13 (in the example illustrated in FIG. 11, the cores 13A and 13B). When the execution of the partial processing 39 is completed, the dependency relationship of the image processing DAG 50A is updated, and the partial processing 39 which becomes newly executable based on the dependency relationship is stored in the task queue 64. In FIG. 11, the partial processing 39 of which the execution is completed is illustrated by a shaded circle, and the partial processing 39 which becomes newly executable based on the dependency relationship is illustrated by a black circle.

Figure 12:
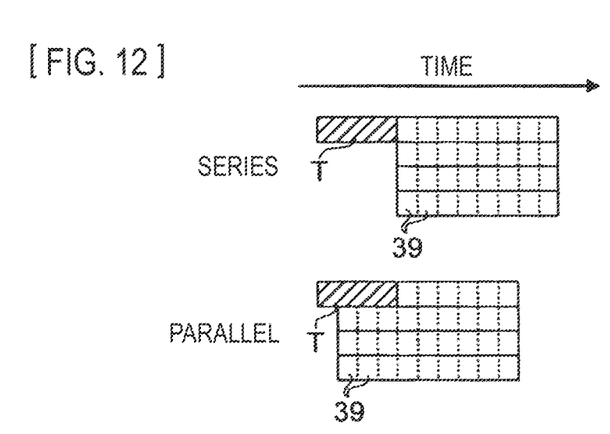
FIG. 12 is a schematic diagram illustrating an example of an execution time in cases where a task for updating an image processing DAG and partial processing are executed on one piece of image data in series and in parallel.

As described above, according to the present exemplary embodiment, the task T and the partial processing 39 are executed in parallel. Therefore, as illustrated in FIG. 12, as an example, a processing speed of the image processing is improved as compared with a case where the task T and the partial processing 39 are executed in series. In an upper portion of FIG. 12, a case where the task T and the partial processing 39 are executed in series is illustrated, and in a lower portion of FIG. 12, a case where the task T and the partial processing 39 are executed in parallel as in the present exemplary embodiment is illustrated.

Figure 13:
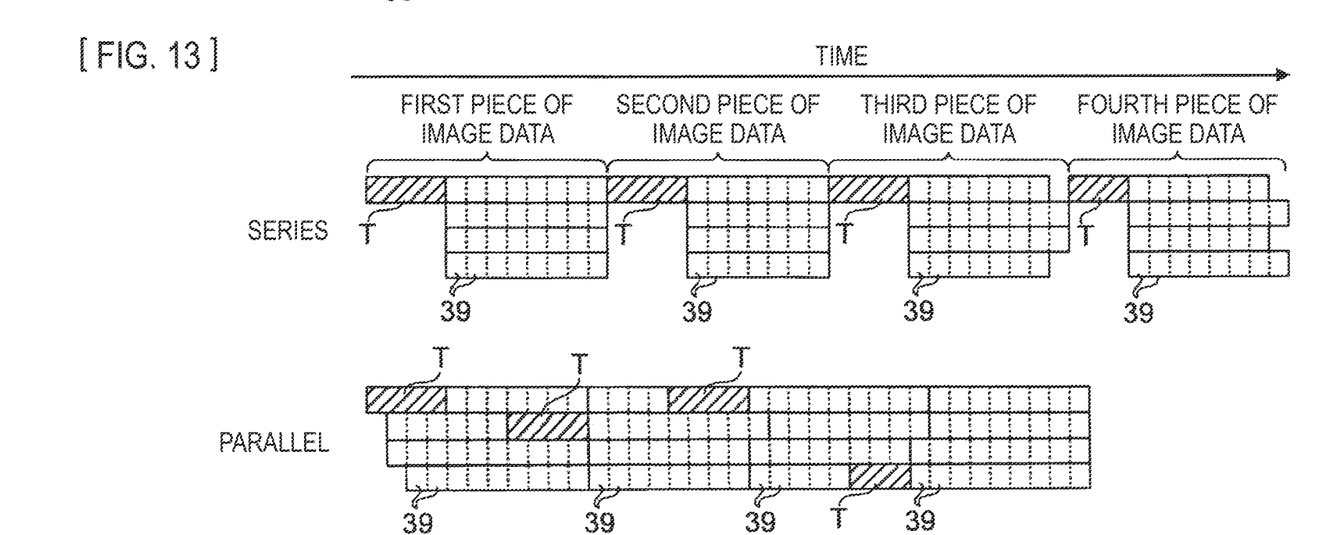
FIG. 13 is a schematic diagram illustrating an example of an execution time in cases where a task for updating an image processing DAG and partial processing are executed on plural pieces of image data in series and in parallel.

In addition, as illustrated in FIG. 13, as an example, in a case where the image processing is continuously executed on plural pieces of input image data, even when all the partial processing 39 on the input image data which is previously input is not completed, execution of the task T and the partial processing 39 on the input image data which is later input is started. Therefore, in this case, a processing speed of the image processing is further improved as compared with a case where the task T and the partial processing 39 are executed in series. In an upper portion of FIG. 13, a case where the task T and the partial processing 39 are executed in series is illustrated, and in a lower portion of FIG. 13, a case where the task T and the partial processing 39 are executed in parallel as in the present exemplary embodiment is illustrated.

Here, in a case where the image processing is continuously executed on the plural pieces of input image data, for example, a higher priority may be imparted to the partial processing 39 for executing the image processing on the input image data which is previously input than the partial processing 39 for executing the image processing on the input image data which is later input. In this case, in a case where the plural pieces of partial processing 39 become executable, the partial processing 39 may be stored in the task queue 64 in descending order of priority. Thereby, it is possible to prevent completion of the image processing on the image data which is later input before completion of the image processing on the image data which is previously input.

In addition, in the above-described embodiment, although a mode in which various programs are stored (installed) in the storage unit 20 in advance is described, the present invention is not limited thereto. The various programs may be provided by being recorded on a recording medium such as a CD-ROM, a digital versatile disk read only memory (DVD-ROM), or a universal serial bus (USB) memory. In addition, various programs may be downloaded from an external device via a network.

While various exemplary embodiments have been described above, these embodiments may be combined with each other as appropriate.

In addition, the present disclosure is not limited to each of the above-described embodiments, and can be freely modified in various forms without departing from the spirit of the present disclosure.

This application is based upon and claims the benefit of priority from Japanese Patent Application No. 2016-060526 filed on Mar. 24, 2016, the entire contents of which are incorporated herein by reference.

REFERENCE SIGNS LIST

10: COMPUTER
12: COMPUTATION UNIT
13, 13A to 13C: CORE
14: MEMORY
16: DISPLAY UNIT
18: OPERATION UNIT
20: STORAGE UNIT
22: IMAGE DATA SUPPLY UNIT
24: IMAGE OUTPUT UNIT
26: BUS
30: OPERATING SYSTEM
32: APPLICATION PROGRAM GROUP
34: IMAGE PROCESSING PROGRAM GROUP
36: MODULE LIBRARY
38: IMAGE PROCESSING MODULE
39, 39A to 39C: PARTIAL PROCESSING
40: BUFFER MODULE
42: PROCESSING CONFIGURATION UNIT
46: PROCESSING CONTROL UNIT
50A, 50B: IMAGE PROCESSING DAG

60: PROCESSING UNIT
62: CONTROL UNIT
64: TASK QUEUE
66: OUTPUT UNIT
B1 to B3: DIVISION IMAGE
G: IMAGE
T: TASK

The invention claimed is:

1. An image processing device that executes image processing by each object of an object group in which a plurality of objects are connected to each other in a directed acyclic graph form, the image processing device comprising:
  a memory storing instructions; and
  at least one hardware processor configured to execute the instructions by implementing:
    updating processing and imparting processing, the updating processing comprising updating image processing which is executed by each object of the object group to partial processing which performs image processing on division image data representing a division image obtained by dividing an input image represented by input image data into a plurality of partial regions, and the imparting processing comprising imparting a dependency relationship between pieces of the partial processing of the objects connected to each other; and
    control comprising causing a plurality of computation devices to execute, in parallel, the updating processing and the imparting processing by the processing unit and the partial processing which becomes executable based on the dependency relationship.

2. The image processing device according to claim 1, wherein the at least one hardware processor is further configured to execute the instructions by implementing a task comprising sequentially executing the updating processing and the imparting processing for each object of the object group in a task queue, sequentially storing the partial processing which becomes executable based on the dependency relationship in the task queue, and performing control such that the updating processing and the imparting processing and the partial processing are executed in parallel, and each of the plurality of computation devices sequentially reads and executes the stored task from the task queue.

3. The image processing device according to claim 2, wherein the at least one hardware processor is further configured to execute the instructions by, in a case where the image processing is continuously performed on a plurality of pieces of input image data, implementing performance of priority imparting processing of imparting a higher priority to a first partial processing which comprises executing the image processing on the input image data which is previously input than a second partial processing which comprises executing the image processing on the input image data which is later input, and
  wherein the at least one hardware processor is further configured to execute the instructions by, in a case where a plurality of pieces of partial processing become executable based on the dependency relationship, implementing control such that the plurality of pieces of partial processing are executed in descending order of the priority.

4. The image processing device according to claim 2, wherein the dependency relationship is a relationship between the objects connected to each other, in which the partial processing of the object connected to a post-stage becomes executable in a case where the partial processing of the object connected to a pre-stage is completed.

5. The image processing device according to claim 1, wherein the at least one hardware processor is further configured to execute the instructions by, in a case where the image processing is continuously performed on a plurality of pieces of input image data, implementing performance of priority imparting processing of imparting a higher priority to a first partial processing which comprises executing the image processing on the input image data which is previously input than a second partial processing which comprises executing the image processing on the input image data which is later input, and
  wherein the at least one hardware processor is further configured to execute the instructions by, in a case where a plurality of pieces of partial processing become executable based on the dependency relationship, implementing control such that the plurality of pieces of partial processing are executed in descending order of the priority.

6. The image processing device according to claim 5, wherein the dependency relationship is a relationship between the objects connected to each other, in which the partial processing of the object connected to a post-stage becomes executable in a case where the partial processing of the object connected to a pre-stage is completed.

7. The image processing device according to claim 1, wherein the dependency relationship is a relationship between the objects connected to each other, in which the partial processing of the object connected to a post-stage becomes executable in a case where the partial processing of the object connected to a pre-stage is completed.

8. An image processing method for image processing by each object of an object group in which a plurality of objects are connected to each other in a directed acyclic graph form, the image processing method comprising:
  implementing updating processing and imparting processing, the updating processing comprising updating image processing which is executed by each object of the object group to partial processing which performs image processing on division image data representing a division image obtained by dividing an input image represented by input image data into a plurality of partial regions, and the imparting processing comprising imparting a dependency relationship between pieces of the partial processing of the objects connected to each other; and
  implementing controlling processing comprising causing a plurality of computation devices to execute, in parallel, the updating processing and the imparting processing by the processing unit and the partial processing which becomes executable based on the dependency relationship.

9. A non-transitory computer readable medium storing a program causing a computer to execute a process for image processing, the process comprising: processing and controlling in an image processing device according to the image processing method of claim 8.

10. The image processing method according to claim 8, further comprising implementing a task comprising sequentially executing the updating processing and the imparting processing for each object of the object group in a task queue, sequentially storing the partial processing which becomes executable based on the dependency relationship in the task queue, and performing control such that the updating processing and the imparting processing and the partial processing are executed in parallel, and each of the plurality of computation devices sequentially reads and executes the stored task from the task queue.

11. The image processing device according to claim 10, wherein the dependency relationship is a relationship between the objects connected to each other, in which the partial processing of the object connected to a post-stage becomes executable in a case where the partial processing of the object connected to a pre-stage is completed.

12. The image processing method according to claim 8, further comprising:
   implementing, in a case where the image processing is continuously performed on a plurality of pieces of input image data, performance of priority imparting processing of imparting a higher priority to a first partial processing, which comprises executing the image processing on the input image data which is previously input, than a second partial processing which comprises executing the image processing on the input image data which is later input; and
   implementing, in a case where a plurality of pieces of partial processing become executable based on the dependency relationship, control such that the plurality of pieces of partial processing are executed in descending order of the priority.

13. The image processing method according to claim 10, further comprising:
   implementing, in a case where the image processing is continuously performed on a plurality of pieces of input image data, performance of priority imparting processing of imparting a higher priority to a first partial processing, which comprises executing the image processing on the input image data which is previously input, than a second partial processing which comprises executing the image processing on the input image data which is later input; and
   implementing, in a case where a plurality of pieces of partial processing become executable based on the dependency relationship, control such that the plurality of pieces of partial processing are executed in descending order of the priority.

14. The image processing device according to claim 12, wherein the dependency relationship is a relationship between the objects connected to each other, in which the partial processing of the object connected to a post-stage becomes executable in a case where the partial processing of the object connected to a pre-stage is completed.

15. The image processing method according to claim 8, wherein the dependency relationship is a relationship between the objects connected to each other, in which the partial processing of the object connected to a post-stage becomes executable in a case where the partial processing of the object connected to a pre-stage is completed.

16. A non-transitory computer readable medium storing a program causing a computer to execute image processing by each object of an object group in which a plurality of objects are connected to each other in a directed acyclic graph form, the image processing comprising:
   implementing updating processing and imparting processing, the updating processing comprising updating image processing which is executed by each object of the object group to partial processing which performs image processing on division image data representing a division image obtained by dividing an input image represented by input image data into a plurality of partial regions, and the imparting processing comprising imparting a dependency relationship between pieces of the partial processing of the objects connected to each other; and
   implementing controlling processing comprising causing a plurality of computation devices to execute, in parallel, the updating processing and the imparting processing by the processing unit and the partial processing which becomes executable based on the dependency relationship.

17. The non-transitory computer readable medium according to claim 16, wherein the image processing further comprises implementing a task comprising sequentially executing the updating processing and the imparting processing for each object of the object group in a task queue, sequentially storing the partial processing which becomes executable based on the dependency relationship in the task queue, and performing control such that the updating processing and the imparting processing and the partial processing are executed in parallel, and each of the plurality of computation devices sequentially reads and executes the stored task from the task queue.

18. The non-transitory computer readable medium according to claim 17, wherein the dependency relationship is a relationship between the objects connected to each other, in which the partial processing of the object connected to a post-stage becomes executable in a case where the partial processing of the object connected to a pre-stage is completed.

19. The non-transitory computer readable medium according to claim 16, wherein the image processing further comprises:
   implementing, in a case where the image processing is continuously performed on a plurality of pieces of input image data, performance of priority imparting processing of imparting a higher priority to a first partial processing, which comprises executing the image processing on the input image data which is previously input, than a second partial processing which comprises executing the image processing on the input image data which is later input; and
   implementing, in a case where a plurality of pieces of partial processing become executable based on the dependency relationship, control such that the plurality of pieces of partial processing are executed in descending order of the priority.

20. The non-transitory computer readable medium according to claim 16, wherein the image processing further comprises:
   implementing, in a case where the image processing is continuously performed on a plurality of pieces of input image data, performance of priority imparting processing of imparting a higher priority to a first partial processing, which comprises executing the image processing on the input image data which is previously input, than a second partial processing which comprises executing the image processing on the input image data which is later input; and
   implementing, in a case where a plurality of pieces of partial processing become executable based on the dependency relationship, control such that the plurality of pieces of partial processing are executed in descending order of the priority.

21. The non-transitory computer readable medium according to claim 16, wherein the dependency relationship is a relationship between the objects connected to each other, in which the partial processing of the object connected to a post-stage becomes executable in a case where the partial processing of the object connected to a pre-stage is completed.

* * * * *